(12) United States Patent
Svonja

(10) Patent No.: US 7,343,699 B2
(45) Date of Patent: Mar. 18, 2008

(54) METHOD AND APPARATUS FOR DRYING

(76) Inventor: George Svonja, 50 Aysgarth Park, Holyport, Maidenhead Berkshire, SL6 2HQ (GB)

(*) Notice: Subject to any disclaimer, the term of this patent is extended or adjusted under 35 U.S.C. 154(b) by 0 days.

(21) Appl. No.: 10/518,864

(22) PCT Filed: Jun. 20, 2003

(86) PCT No.: PCT/GB03/02702
§ 371 (c)(1),
(2), (4) Date: Mar. 30, 2005

(87) PCT Pub. No.: WO2004/029530
PCT Pub. Date: Apr. 8, 2004

(65) Prior Publication Data
US 2005/0210702 A1    Sep. 29, 2005

(30) Foreign Application Priority Data
Jun. 21, 2002 (GB) .............................. 0214412.9

(51) Int. Cl.
F26B 3/00    (2006.01)

(52) U.S. Cl. ............................. 34/467; 34/80

(58) Field of Classification Search .................. 34/380, 34/467, 78, 80, 90; 62/643; 95/45; 96/13
See application file for complete search history.

(56) References Cited

U.S. PATENT DOCUMENTS

| | | | |
|---|---|---|---|
| 2,236,398 A | 3/1941 | Drummond | |
| 4,466,202 A | 8/1984 | Merten | |
| 4,934,148 A * | 6/1990 | Prasad et al. | 62/655 |
| 4,982,512 A * | 1/1991 | McClenny | 34/77 |
| 5,108,968 A | 4/1992 | Ellingham et al. | |
| 6,158,147 A | 12/2000 | Smith et al. | |
| 2002/0125591 A1 * | 9/2002 | Jaynes et al. | 264/12 |

* cited by examiner

Primary Examiner—S. Gravini
(74) Attorney, Agent, or Firm—Gamburd Law Group LLC

(57) ABSTRACT

The method of removing moisture from a material contained within a dryer (3) comprises heating a first stream of gas (A3); passing the heated stream of gas through a dryer (3) to extract moisture from the material to be dried; returning a first portion (E3) of the used gas from an outlet of the dryer (3) to the heater (2), re-heating the second stream of gas (E3) in the heater (2); and passing the heated second stream (B3) back into the dryer (3), wherein the first stream of gas (A3) is atmospheric air from which at least a proportion of the nitrogen present therein has been removed, to thereby increase the percentage by volume of oxygen in the first stream of gas (A3).

20 Claims, 2 Drawing Sheets

METHOD AND APPARATUS FOR DRYING

CROSS-REFERENCE TO RELATED APPLICATIONS

This application is a U.S. National Stage Application of, and claims priority to, International Patent Application PCT/GB2003/002702, entitled "METHOD AND APPARATUS FOR DRYING," having an International Filing Date of Jun. 20, 2003, the entire content of which is incorporated herein by reference, and further claims priority to United Kingdom Patent Application Serial Number GB 0214412.9, filed Jun. 21, 2002, the entire content of which is also incorporated herein by reference.

The present invention relates to an improved method and apparatus for drying. In particular, the present invention is especially concerned, but not exclusively, with the drying of products such as biomass and minerals, and particulate mass.

It is often necessary to remove unwanted moisture from materials such as animal feed, wood chips, sewerage, grass, and chemical products, and it is known to use a drying apparatus for the purpose. Such dryers can take various forms, such as spray dryers, fluidised bed dryers, rotary dryers, and pneumatic conveying dryers.

In general, a drying apparatus falls into one of two categories:

the first category is termed an open cycle dryer, which takes in air or other incondensable carrier gas, and heats it, before using the heated air for the purposes of drying the material from which moisture is to be removed. The used air is then subsequently expelled into the atmosphere as an exhaust gas. With reference to FIG. 1 of the accompanying drawings, a schematic diagram of a typical open cycle dryer is represented by reference numeral 1a. The dryer 1a comprises a heating means 2, which is operatively connected to a drying means 3, which is operatively connected to a fan means 4. In order to remove moisture from a material (not shown), the material is continuously fed into and discharged from the drying means 3, and a stream of air, indicated on the figure by arrow A, is passed through the heating means 2, in which fuel is burnt. This heats the stream of air to produce a heated air stream, indicated on the figure by arrow B, which is passed through the drying means 3. As the heated air stream passes over the material in the drying means 3, moisture in the material is evaporated and carried in the air stream away from the material. After the stream of air B has passed through the drying means 3, it has substantially cooled down, as the heat energy has been used in the evaporation of the moisture, and contains various impurities and entrained moisture. The used stream of gas is represented by arrow C. With the open cycle dryer 1a, the used stream of gas C then passes into the fan means 4, which expels the used gas stream C into the atmosphere as an exhaust stream D.

The second category of dryer is termed a partially closed cycle dryer, in which a proportion, typically between 50% and 70%, of the used gas is recycled. With reference to FIG. 2 of the accompanying drawings, a typical partially closed cycle dryer is indicated by reference numeral 1b. The dryer 1b comprises a heating means 2, which is operatively connected to a drying means 3, which in turn is operatively connected to a fan means 4, which is operatively connected to the heating means 2. The material to be dried (not shown) is continuously fed into and discharged from the drying means 3. In a similar manner to the dryer of FIG. 1, a gas stream A1 is passed through the heating means 2, in which fuel is burnt. This heats the gas stream, which then enters the drying means 3 as heated gas stream B1. As it passes through the drying means 3, the heated gas stream B1 removes moisture from the material, and then passes out from the dryer as used gas stream C1, and then through the fan means 4. However, in this type of dryer, unlike the dryer of FIG. 1, all of the used gas stream is not expelled into the atmosphere as an exhaust stream, but instead, only a proportion D1 thereof. The remaining portion E1 is returned to the heating means 2, and is re-heated and recycled through the drying means 3. As detailed previously, about 70% of the used gas is recycled, and in this way, the system as a whole becomes more efficient than a typical open cycle dryer, since the heat losses are reduced. With a typical partially closed cycle dryer, the total heat usage is usually between 650 and 800 kcal/kg of evaporation, compared with a typical total heat usage of between 1000 and 1200 kcal/kg of evaporation for an open cycle dryer. In a partially closed cycle system, the material is dried in an atmosphere of air containing gaseous combustion products and some recycled air, and in this way, the amount of exhaust gas expelled to the atmosphere is significantly reduced, thereby reducing the heat lost from the system, resulting in a more efficient system. The temperature at which this may be achieved is limited by the incondensable gas content of the air within the drying means, which directly affects the wet bulb temperature of the air stream. In a typical partially closed cycle dryer of the kind referred to above, the wet bulb temperature is between 75° C. and 85° C. at atmospheric pressure, as opposed to a wet bulb temperature of up to between 55° C. and 60° C. achievable with a typical open cycle dryer. As the system efficiency increases exponentially with wet bulb temperature, it is desirable to maximise the wet bulb temperature of such drying systems.

In practice there is a limit to the amount of gas which can be recycled in this way by systems which are directly fired. This limitation arises from the fact that the combustion gases must be exhausted together with the vapour. This in turn limits the wet bulb temperature.

Further efficiencies can be obtained through use of the exhaust gas from either the open or closed cycle systems, for example, as a heat source for other purposes. Accordingly, in this case, it is desirable that some heat be removed, and some recovery systems recover heat by condensation of water vapour in the exhaust gas.

U.S. Pat. No. 4,101,264 describes a drying method and apparatus, which operates as a closed cycle, the dryer comprising two dryer sections. A potentially offensively odorous material is dried in the first dryer section and a material which is not offensively odorous is dried in the second dryer section. The system operates on the basis that the used gas from the first dryer section is passed through an incinerator to pyrolyze the odorous content of the used gas, the pyrolyzed gas is then used to heat and thereby dry the material in the second dryer section. In this way, the odorous content in the exhaust gas from the first dryer section is substantially eliminated.

In order to increase the amount of used air recycled in a closed cycle system, a heat exchanger has previously been considered to be appropriate means for heating re-circulating gases. By including a heat exchanger in a closed cycle dryer system, almost all of the exhaust gas may be recycled. FIG. 3 of the drawings shows a schematic diagram of a typical closed cycle dryer incorporating a heat exchanger, and is indicated by reference numeral 1c. The dryer 1c comprises a heating means 2, which is operatively connected to a heat exchanger 5, which in turn is operatively connected to a drying means 3. The drying means 3 is then operatively connected to a fan means 4. The material to be dried (not shown) is continuously fed into and discharged from the drying means 3. In a similar manner to the dryer of FIG. 2, an air stream A2 is passed through the heating means 2, in which fuel is burnt. This heats the air stream A2, which then passes into the heat exchanger 5, as heated air stream F2. An air stream E2 passes separately through the heat exchanger 5 and is heated by the transfer of heat energy from the air stream A2 to the air stream E2. The heated air stream E2 then leaves the heat exchanger 5 as heated air stream B2, and is passed through the drying means 3 in order to remove the moisture from the material contained therein. The air stream then leaves the drying means 3 as used gas stream C2, and passes through the fan means 4 to be returned to the heat exchanger 5, as gas stream E2. In this way, the used gas stream C2 is recycled, and hence the system as a whole is more efficient, since heat losses are reduced.

With a typical closed cycle dryer incorporating a heat exchanger, the total heat usage is usually between 850 and 1000 kcal/kg of evaporation. As detailed previously, a closed cycle dryer incorporating a heat exchanger may be run relatively efficiently, but has disadvantages including size, and the requirement for regular cleaning. In such a dryer, an example of which is a contact dryer, the material is dried in an atmosphere of superheated steam containing only a small amount of incondensable gas. This results in an exhaust gas made almost entirely from steam, which can itself be used for other heating purposes.

U.S. Pat. No. 5,271,162 describes a process for the emission-free drying of a substance in a drying drum. The dryer described in the application is a closed cycle dryer, and incorporates a heat exchanger for the purposes of heating the drying gas used in the system. Fossil fuels are burnt in atmospheric air in a combustion chamber, thereby providing a stream of hot air, which removes moisture from material stored in a drying drum. The emission of odorous gases and dust is eliminated by maintaining the pressure of the atmospheric air and vapour mixture in the drying drum below external atmospheric pressure.

Another type of drying process is described in U.S. Pat. No. 5,697,167, in which a substance, in particular wood shavings, wood chips or wood flakes, is dried using two heat exchangers for heating the drying gas, which is atmospheric air. By using a first heat exchanger and a supplementary heat exchanger, the thermal stress on the heat exchanger elements is reduced, since the temperature of the drying gas is actually brought down by the supplementary heat exchanger before it passes through the first heat exchanger. Such a reduction in thermal stress serves to increase the lifetime of the heat exchanger elements. However, this further adds to the cost and size of the system as the system is utilises two heat exchangers.

There are a number of disadvantages associated with using a dryer system incorporating a heat exchanger, not least the fact that a typical heat exchanger is very large and cumbersome. Furthermore, heat exchangers generally have to operate at very high temperatures, require a large pressure drop for their operation, and generally require regular cleaning which requires the system to be closed down and so is economically undesirable. In addition, there tends to be a significant heat loss to the atmosphere on the heating side of the exchanger, which reduces the efficiency of the dryer system of which the heat exchanger is a part. Further still, the system as a whole is rendered more complex by the presence of a heat exchanger, resulting in turn in increased expense. The efficiency of a closed cycle dryer having a heat exchanger is actually less than that of a typical closed cycle dryer, but despite this, the use of heat exchangers has remained the preferred choice.

In European Patent No. 0 561 044 a method is described for operating an incinerator with simultaneous control of temperature and products of incomplete combustion. The method uses atmospheric air to which extra oxygen is added to burn the fuel. The system works on the principle that, if atmospheric air alone is used, the temperature is prevented from reaching high enough levels, because pressure constraints limit the amount of gas that an operator can add to the system. So for a given volume of gas an increase in the proportion of oxygen, through the addition of extra oxygen, enables the system to work more efficiently.

U.S. Pat. No. 5,090,898 describes a gas-fired burner which may be adapted to heat a substrate to remove the moisture therefrom. The burner is fed with atmospheric air to which oxygen has been added, generally at least 30%. The dryer may be adapted to dry one or both edges of a paper web, which is fed through the dryer by suitable means. Although the addition of extra oxygen to the drying gas can improve the efficiency of the system, pure oxygen is very expensive and so the drying process described in this document is generally not considered to be economically viable.

Furthermore, U.S. Pat. No. 4,626,301 describes a method of making a fire resistant layered structure by drying an aqueous alkali metal silicate composition on a glass substrate in the presence of a drying atmosphere consisting of a controlled mixture of gases, containing at least 30% oxygen by volume. The glass substrate, coated with an aqueous composition of hydrated alkali metal silicate is placed on a heating plate within a drying chamber. A fire-proof layer is then dried in solid form onto the substrate, and another glass plate is then bonded thereto. The sandwich structure produced is then removed from the heating chamber to be used as necessary. The drying atmosphere is circulated through the drying chamber by a pump means. To bring the oxygen concentration of the drying atmosphere to at least 30% by volume, oxygen from an oxygen tank is fed into the drying atmosphere. Although the addition of pure oxygen helps to improve the efficiency of the process of production of the sandwich structure by helping to prevent the formation of bubbles on the fire-proof layer, pure oxygen is very expensive, and so, as with the process described in U.S. Pat. No. 5,090,898, the drying process described in U.S. Pat. No. 4,626,301 is generally not considered to be economically viable.

There exists a need for a drying apparatus, which does not have or alleviates the disadvantages, including those previously listed, associated with known drying systems, such as those having a heat exchanger but which retains the advantages, in particular a high proportion of gas being recycled, and a low proportion of incondensable gas content present in the gas stream.

In accordance with a first aspect of the present invention, there is provided a method of removing moisture from a material, the method comprising the steps of: heating a first stream of gas using a heater; passing said stream of heated gas through a dryer, to extract moisture from said material contained within the dryer, returning a first portion of the used gas, which constitutes a second stream of gas, from an outlet of the dryer to the heater, re-heating the second stream of gas in the heater, and passing the heated second stream of gas back into the dryer, wherein the first stream of gas is atmospheric air from which at least a proportion of the nitrogen present therein has been removed, to thereby increase the percentage by volume of oxygen in the first stream of gas.

In accordance with a second aspect of the present invention, there is provided a drying apparatus for drying material containing moisture, comprising a supply of drying gas, which is atmospheric air from which at least a proportion of the nitrogen present therein has been removed, to thereby increase the percentage by volume of oxygen in the drying gas, said drying gas constituting a first stream of gas; a heater for heating the first stream of gas; a dryer operatively connected to the heater through which the heated first stream of gas is passed for the purposes of removing moisture from said material; and a conduit for circulating a first portion of the used stream of gas, which constitutes a second stream of gas, back into the heater to be re-heated.

Pure oxygen is an expensive, high quality gas compared with atmospheric air, and owing to the quantities of gas required in drying systems, economic considerations have prejudiced the adoption of drying systems which require pure oxygen added to the heated air stream. However, by removing at least some of the nitrogen from atmospheric air, as opposed to adding pure oxygen, the percentage by volume of oxygen in the gas stream can be increased at a fraction of the cost of pure oxygen.

In the context of this document reference herein to oxygen enriched air is reference to the removal of nitrogen from the air to increase the percentage by volume of oxygen i.e. nitrogen depleted air.

Because of the expense of pure oxygen the trend up until now in the development of drying systems has been to use high quality fuels to achieve the temperatures needed and thereby reducing atmospheric pollution by reducing the amount of noxious emissions in the exhaust gas.

Nitrogen constitutes the bulk of the incondensable gas content in a system using atmospheric air, and accordingly, where oxygen enriched air is used as the gas stream rather than atmospheric air the efficiency of the system is increased. It has been realised with the present invention that through this reduction in the amount of nitrogen in the gas stream, a wet bulb temperature of up to 98° C. at atmospheric pressure, and possibly higher, may be achieved, which approaches the temperatures achievable with a closed cycle dryer having a heat exchanger.

Atmospheric air normally contains around 78% nitrogen. In a preferred embodiment of the invention, at least 50% of the nitrogen normally present in atmospheric air is removed. More preferably still, between 97% and substantially 100% of the nitrogen normally present in atmospheric air is removed, this preferably results in the first stream of gas used to remove moisture from the material containing between 90% and 99% oxygen, as opposed to 21%, which is the typical proportion of oxygen in atmospheric air. In a preferred embodiment, 97% of the nitrogen normally present in atmospheric air is removed, resulting in the first stream of gas containing 90% oxygen. It should be noted that any reduction in the amount of nitrogen in the gas stream and subsequent increase in percentage by volume of oxygen is advantageous, but the less nitrogen present in the gas stream, the more efficient the system becomes.

Preferably, the nitrogen is removed from the atmospheric air by means of a molecular sieve, or membrane filtration system. Alternatively, the nitrogen, and other inert gases, are removed from the atmospheric air cryogenically.

It is further preferable that the material to be dried, such as particulate matter, is continuously fed through the drying apparatus as opposed to being batch fed into the system. In order to dry particulate matter, the particles, which may vary between sub-micron size and around half an inch in diameter, may be suspended in the gas, by means of agitation, for example. In this way, the drying gas and the particulate matter are intimately mixed and the drying gas is in contact with all surfaces of the particulate matter during the drying process. This further serves to improve the efficiency of the drying system.

It is preferable that an exhaust component is provided for expelling the remaining portion of the used gas into the atmosphere as an exhaust stream. Furthermore, a fluid pump, for example a fan may be provided for ensuring movement of the gas stream and the used gas about the drying apparatus, and also for dividing the gas into an exhaust stream and a recycled stream. More preferably still, a pressure control fan is additionally provided to divide the gas into an exhaust stream and a recycled stream, and de-pressurise the system, when necessary. In addition, downstream heat recovery and gas cleaning systems are provided, whereby the pressure control fan drives the exhaust gas through downstream heat recovery and gas cleaning systems. It is preferable that the heater used to heat the first stream of gas is a directly fired heater.

The invention will now be further described, by way of example only, with reference to the accompanying drawings in which like reference numerals are employed to identify like components.

Figure 1:
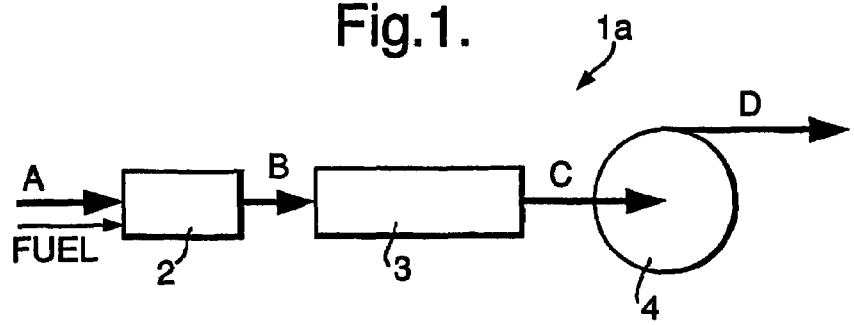
FIG. 1 is a schematic diagram of a known open cycle drying apparatus.
Figure 2:
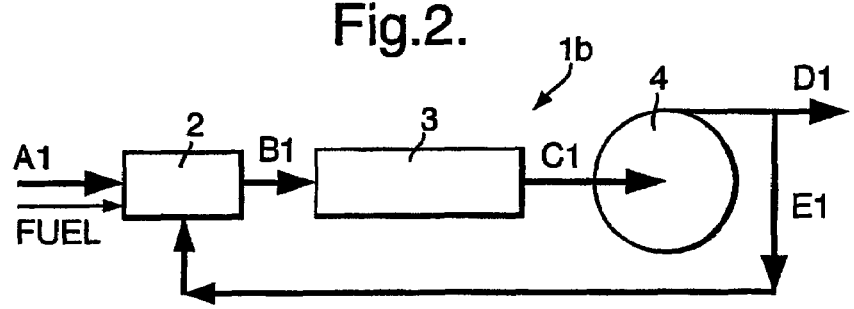
FIG. 2 is a schematic diagram of a known closed cycle drying apparatus.
Figure 3:
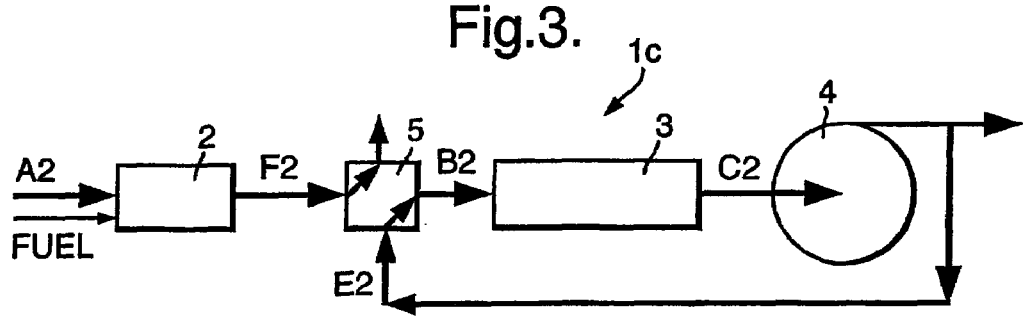
FIG. 3 is a schematic diagram of a known closed cycle drying apparatus incorporating a heat exchanger.
Figure 4:
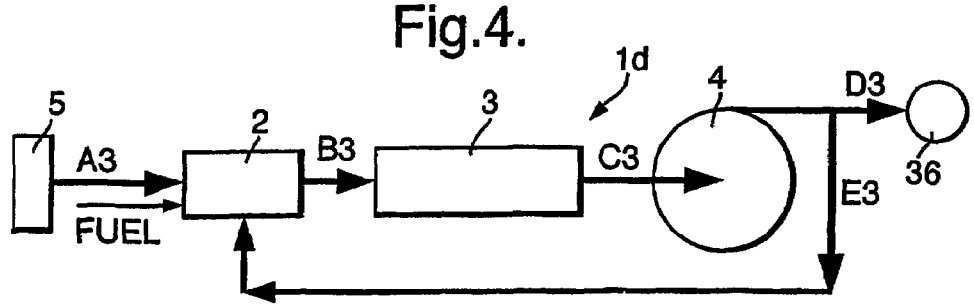
FIG. 4 is a schematic diagram of a drying apparatus in accordance with the present invention.

With reference to FIG. 4, a closed cycle dryer is indicated by reference numeral 1$d$. The drying apparatus 1$d$ comprises a heater 2 in which fuel is burnt, the heater 2 being operatively connected to a dryer 3, which in turn is operatively connected to a fan 4. The dryer 3 communicates with a supply S of oxygen enriched air A3. As far as the inventor is aware, oxygen enriched air having a higher percentage by volume of oxygen on account of the removal of nitrogen therefrom has not, up until now, been used in drying systems. The nitrogen depleted air stream A3 from the supply S comprises at least 90% oxygen, typically between 90% and 95%, and contains negligible amounts of nitrogen, but small amounts of $CO_2$ and other gases. (Atmospheric air comprises typically 21% oxygen, 78% nitrogen and 1% other gases.) The nitrogen depleted air stream A3 passes through the heater 2 and downstream of the heater 2 enters the dryer 3 as a heated nitrogen depleted air stream B3. The heated air stream removes moisture from the material in the dryer 3 as it passes therethrough and leaves the dryer 3 as used gas stream C3. Fan 4 is provided for the circulation of the gas stream through the dryer system and also acts to separate the used gas stream C3 into exhaust stream D3 and used gas stream E3 which is returned to the heater 2, to be re-heated. A pressure control fan 36 can also be provided in order to facilitate the separation of the gas stream C3 into the exhaust stream D3 and used gas stream E3. The fan 36 can also be used to de-pressurise the system when required.

Figure 5:
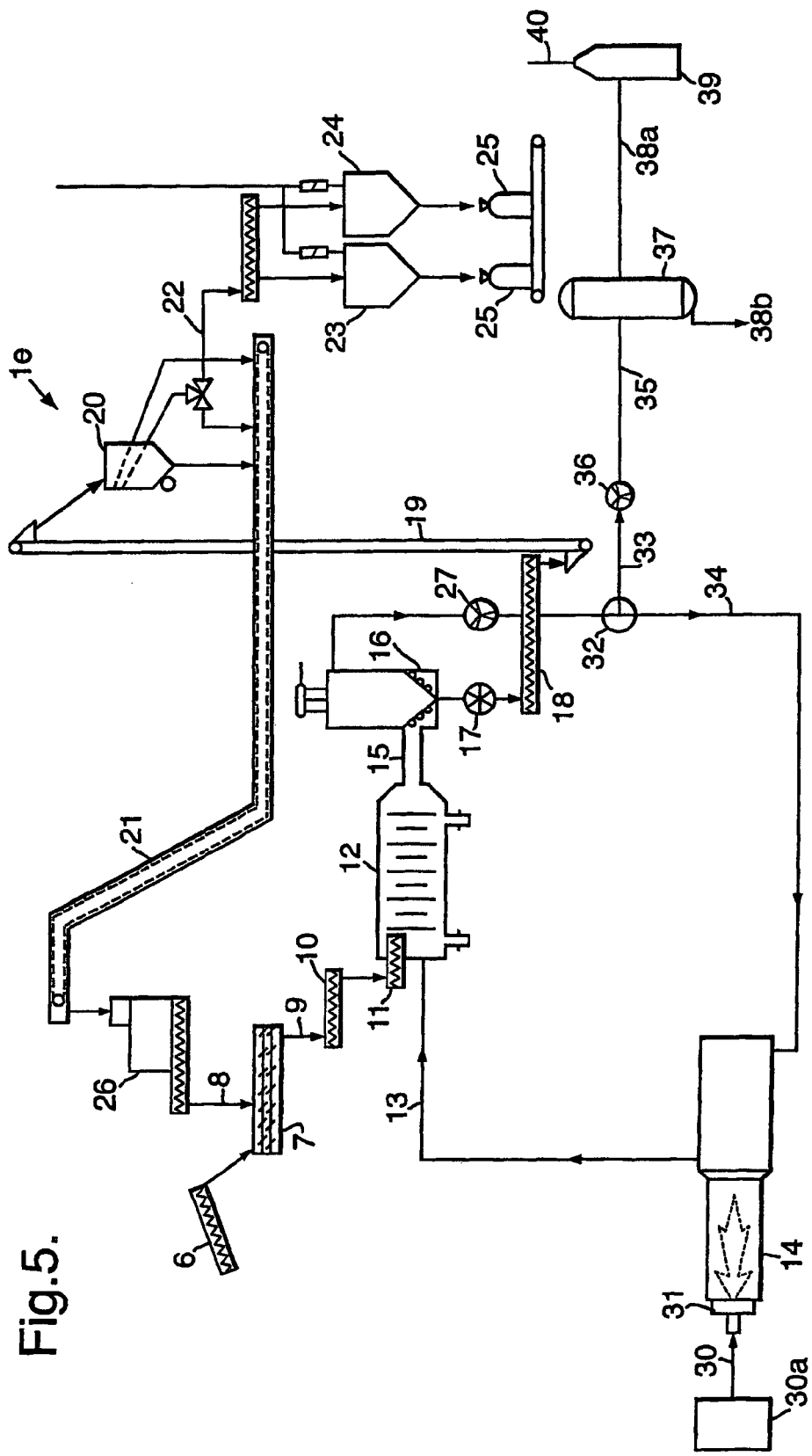
FIG. 5 illustrates a drying apparatus in accordance with the present invention.

One implementation of the dryer system described above with reference to FIG. 4 is illustrated in FIG. 5. Material from which moisture is to be removed is first continuously fed into the drying apparatus 1e via conveyor screw 6. The material, which in this case is in the form of particulate matter, then passes into a mixer 7, whereupon it is mixed to form a mixture 9 with a material 8, also in the form of particulate matter, which has previously passed through the dryer system. The mixture 9 then passes via conveyor screws 10 and 11 into a drying drum 12, which is fed with a heated gas stream 13 from a combustion chamber 14. The mixture 9 is agitated within the drying drum 12 such that it is suspended in the gas stream 13, thereby forming an intimate mix with the heated gas stream. Nitrogen depleted air 30 from a supply 30a enters the combustion chamber 14 via an inlet 31. The heated gas stream 13 dries the mixture 9 in the drying drum 12. The dried mixture is then passed via a conduit 15 into a cyclone separator 16. The cyclone separator separates the dried mixture from any dust, which may be present. The dust is retained in a dust collecting portion, and the mixture falls to the bottom of the separator 16, and then passes through discharge lock 17 onto inclined screw 18, and then onto elevator 19. The mixture is then conveyed via the elevator 19 to a vibratory screen 20, which sorts the mixture, separating heavier, still moist material, which is transferred to a drag-chain conveyor 21, from substantially dry material 22, which is passed to cooling silos 23 and 24 to be subsequently transferred to packaging facilities 25. The still moist material, which has been transferred to the drag-chain conveyor 21 passes into silo 26, and is repeatedly circulated through the same process of drying until it is sufficiently dry to be passed into the cooling silos 23 and 24.

After the gas stream has passed through the drying drum 12, the gas stream is passed, by means of a fan 27, to a separating fan exhaust component 32, which separates the gas stream into a further stream 33, and a recycled stream 34, which is returned to the combustion chamber 14 to be re-heated. A pressure control fan 36 is also provided in order to facilitate the separation of the gas stream into the further stream 33 and recycled stream 34, and also to de-pressurise the system when required. Furthermore, the pressure control fan 36 drives exhaust stream 35 through a downstream heat recovery evaporator 37 where heat is recovered by condensing water 38b from the exhaust 35 to produce a reduced volume exhaust 38a which is then passed through a gas cleaning stage 39 before being expelled to the atmosphere as exhaust 40.

The drying apparatus operates as a closed cycle system, whereby the gas 30, which is continuously fed into the combustion chamber 12 to be heated, is nitrogen depleted air, containing at least 90% oxygen. Given that the nitrogen is substantially eliminated from the gas stream in the system, the majority of incondensable gas is eliminated from the system, typically enabling wet bulb temperatures of about 98° C. to be achieved.

The energy required to be inputted into the dryer system of the present invention approaches the theoretical value plus energy due to wall losses, and furthermore, an exhaust stream having extremely high humidity levels is produced, which up until now, had only been possible when heat exchangers were used. The system can work at increased pressures and thus can act as a steam generator as well as a drying apparatus.

In terms of environmental considerations, the production of harmful $NO_x$ emissions is substantially eliminated, due to the negligible amount of nitrogen in the enriched air stream. This in turn permits the use of lower grade fuels in the system, which may be burnt cleanly.

A further advantage of the system of the present invention is that the principle of using nitrogen depleted atmospheric air as the gas stream is compatible with all types of convective dryer systems, and as a result, may be applied to existing systems without major reconstructive work having to be done. However, it is envisaged that the drying method described herein may also employ pure oxygen.

The drying method and apparatus are not limited to the particular examples given above. Alternative implementations of the method and apparatus are envisaged, without departing from the scope of the present invention defined in the appended claims.

The invention claimed is:

1. A method of removing moisture from a material comprising the steps of:
   providing a first, nitrogen-depleted stream of gas, the first stream of gas being atmospheric air from which at least a proportion of the nitrogen present therein has been removed, to thereby increase the percentage by volume of oxygen in the first stream of gas;
   heating the first, nitrogen-depleted stream of gas using a heater;
   passing said stream of heated, nitrogen-depleted gas through a dryer, to extract moisture from said material contained within the dryer;
   returning a first portion of the used, nitrogen-depleted gas, which constitutes a second stream of gas, from an outlet of the dryer to the heater;
   re-heating the second stream of nitrogen-depleted gas in the heater; and
   passing the heated second stream of nitrogen-depleted gas back into the dryer.

2. A method as claimed in claim 1, wherein at least 50% of the nitrogen normally present in atmospheric air is removed.

3. A method as claimed in claim 2, wherein at least 97% of the nitrogen normally present in atmospheric air is removed.

4. A method as claimed in claim 1, wherein a proportion of the nitrogen normally present in atmospheric air is removed resulting in the first stream of gas containing between 90% and 99% oxygen.

5. A method as claimed in claim 4, wherein a proportion of the nitrogen normally present in atmospheric air is removed resulting in the first stream of gas containing 90% oxygen.

6. A method as claimed in claim 1, further comprising the step of expelling a second portion of the used, nitrogen-depleted gas at or above atmospheric pressure through a heat recovery system before gas treatment and/or exhaust to the atmosphere.

7. A method as claimed in claim 1, further comprising the step of expelling the remaining portion of the used, nitrogen-depleted gas into the atmosphere as an exhaust stream.

8. A method as claimed in claim 1, wherein the nitrogen is removed from the atmospheric air by means of a molecular sieve.

9. A method as claimed in claim 1, wherein the nitrogen is removed from the atmospheric air by means of a membrane filtration system.

10. A method as claimed in claim 1, wherein the nitrogen is removed from the atmospheric air cryogenically.

11. A method as claimed in claim 1, wherein the material to be dried is continuously fed through the dryer.

12. A method as claimed in claim 11, wherein the material to be dried is particulate matter which is held in suspension in the dryer and is intimately mixed with the drying gas.

13. A drying apparatus for drying material containing moisture, comprising
- a supply of nitrogen-depleted drying gas, which is atmospheric air from which at least a proportion of the nitrogen present therein has been removed, to thereby increase the percentage by volume of oxygen in the drying gas, said nitrogen-depleted drying gas constituting a first stream of gas;
- a heater for heating the first steam of nitrogen-depleted gas;
- a dryer operatively connected to the heater through which the heated first stream of nitrogen-depleted gas is passed for the purposes of removing moisture from said material; and
- a conduit for circulating a first portion of the used steam of nitrogen-depleted gas, which constitutes a second stream of nitrogen-depleted gas, back into the heater to be re-heated.

14. An apparatus as claimed in claim 13, wherein the first stream of gas used to remove moisture from the material is atmospheric air having had at least 50% of the nitrogen normally present therein removed therefrom.

15. An apparatus as claimed in claim 13, wherein the first stream of gas used to remove moisture from the material is atmospheric air having had a proportion of the nitrogen normally present therein removed therefrom such that the first stream of gas contains between 90% and 99% oxygen.

16. An apparatus as claimed in claim 13, further comprising an exhaust component for expelling the remaining portion of the used, nitrogen-depleted gas into the atmosphere as an exhaust stream.

17. An apparatus as claimed in claim 13, further comprising a fluid pump for ensuring movement of the nitrogen-depleted gas stream and the used, nitrogen-depleted gas about the drying apparatus.

18. An apparatus as claimed in claim 13, further comprising a heat recovery system for removing heat from a second portion of the used, nitrogen-depleted stream of gas, which constitutes a third stream of nitrogen-depleted gas, to form a fourth stream of gas.

19. An apparatus as claimed in claim 18, further comprising a gas cleaner for cleaning the fourth stream of gas.

20. A drying apparatus for drying material containing moisture, comprising
- a supply of nitrogen-depleted drying gas, which is atmospheric air from which at least fifty percent (50%) of the nitrogen present therein has been removed, to thereby increase the percentage by volume of oxygen in the drying gas to between ninety percent (90%) and ninety-nine percent (99%), said nitrogen-depleted drying gas constituting a first stream of nitrogen-depleted gas;
- a heater for heating the first stream of nitrogen-depleted gas;
- a dryer operatively connected to the heater through which the heated first stream of nitrogen-depleted gas is passed for the purposes of removing moisture from said material; and
- a conduit for circulating a first portion of the used stream of nitrogen-depleted gas, which constitutes a second stream of nitrogen-depleted gas, back into the heater to be re-heated.

* * * * *